April 18, 1939. W. F. SWAGER 2,154,963
DEVICE FOR PREPARING COFFEE
Filed July 14, 1934 2 Sheets-Sheet 1
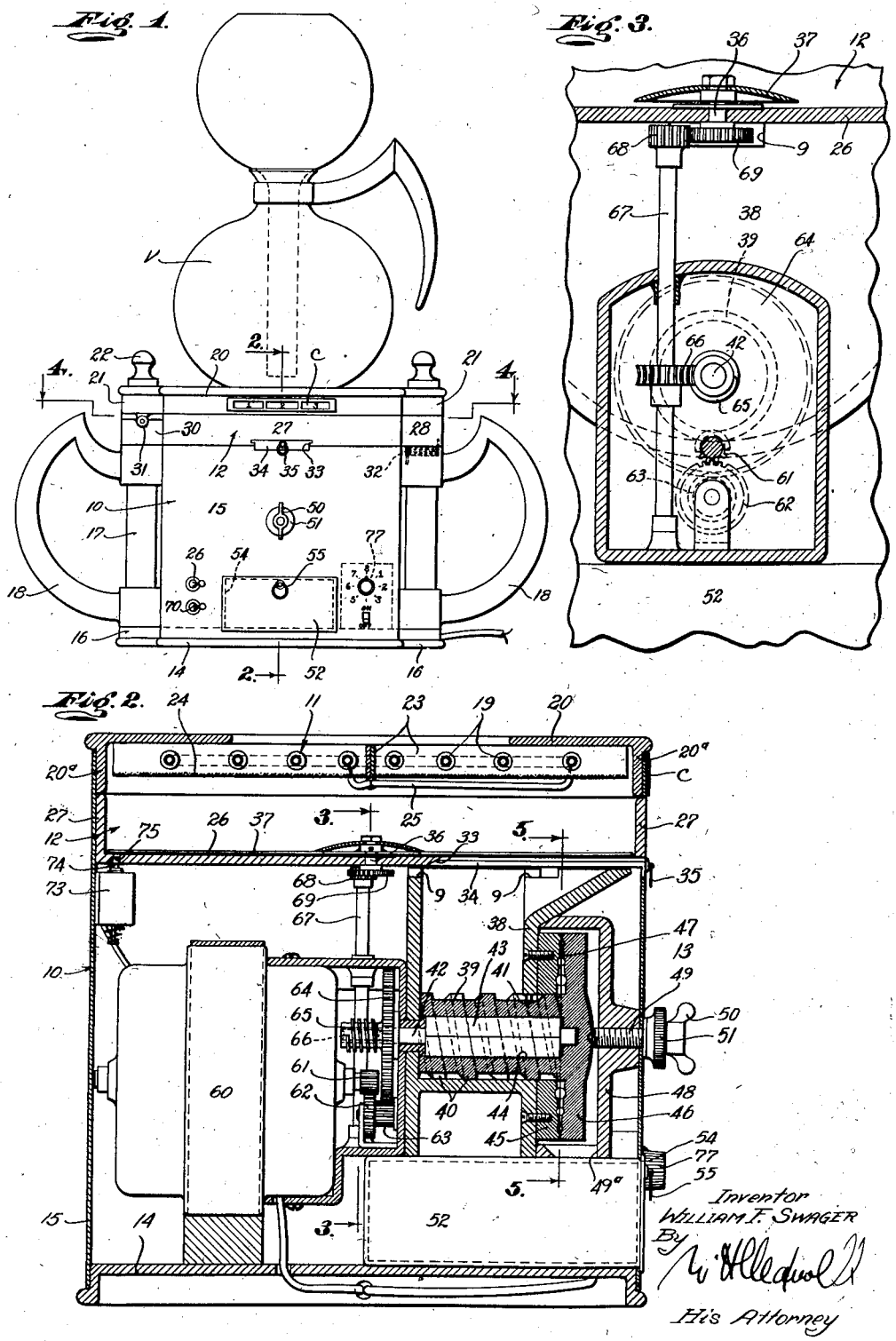

April 18, 1939.  W. F. SWAGER  2,154,963
DEVICE FOR PREPARING COFFEE
Filed July 14, 1934   2 Sheets—Sheet 2
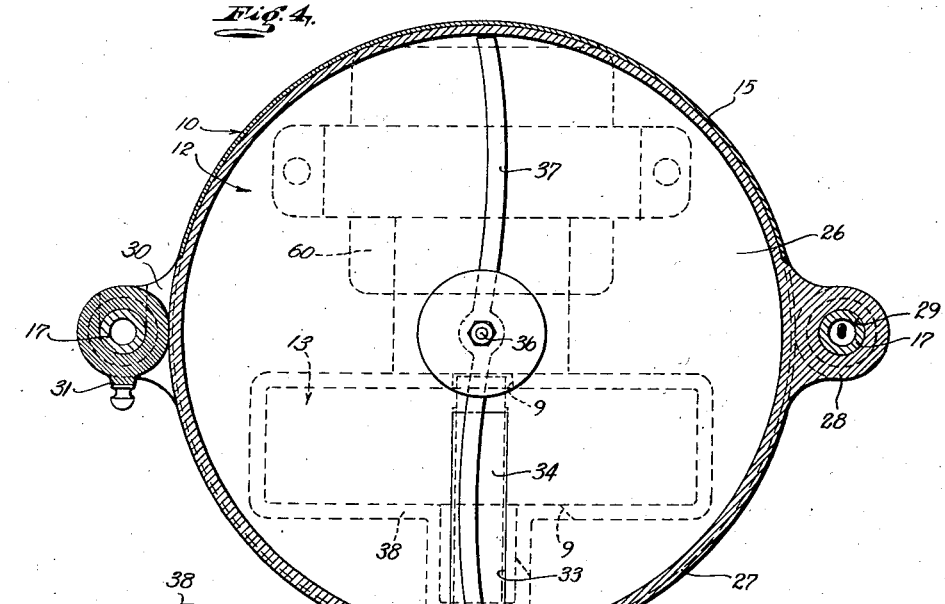
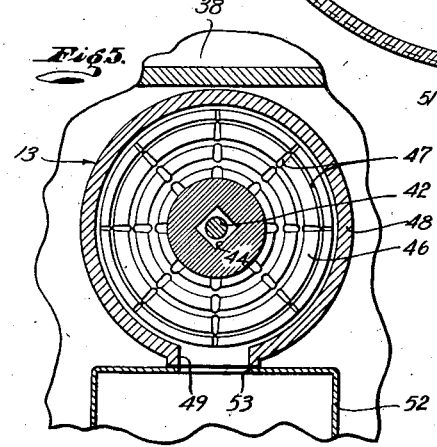
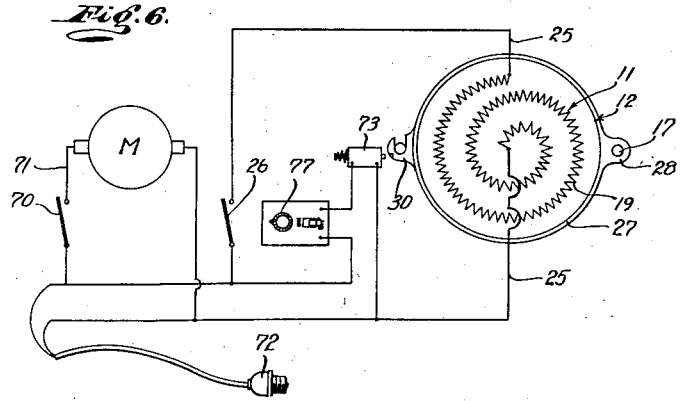
Inventor
WILLIAM F. SWAGER
By
His Attorney Patented Apr. 18, 1939

2,154,963

UNITED STATES PATENT OFFICE 2,154,963

DEVICE FOR PREPARING COFFEE

William F. Swager, Los Angeles, Calif., assignor of one-half to Harold G. Fitzgerald, Los Angeles, Calif.

Application July 14, 1934, Serial No. 735,269

2 Claims. (Cl. 34—23)

This invention relates to an apparatus or device useful in the preparation of beverages and relates more particularly to a device for preparing coffee. A general object of the present invention is to provide a practical, effective and convenient device for preparing coffee.

It is well known that the secret of making good coffee with the desired aroma and flavor is to employ freshly roasted and freshly ground coffee. This has been impossible or at least wholly impracticable with the methods and apparatus heretofore available. The raw or green commercial coffee beans have a film-like covering which effectively excludes air and protects the beans against deterioration. The protective film or covering on the coffee beans is destroyed and falls from the beans as chaff during the roasting operation, leaving the beans exposed to deterioration. The grinding of the coffee further exposes the coffee and the volatile elements which give the coffee its aroma and flavor are to a large degree lost following the roasting and grinding. Further, the oils present in the coffee rapidly become rancid after the roasting of the beans. Attempts have been made to preserve the oils and the volatile elements of the coffee by packing roasted and ground coffee in sealed containers or cans and marketing it as quickly as possible. The coffee is not entirely protected against deterioration in the cans and the entire contents of a can are not ordinarily used immediately following the opening of the can, and the remaining coffee rapidly loses its flavor and its oils become rancid.

Another object of the invention is to provide a device for preparing coffee in which the green coffee beans may be roasted, ground immediately following the roasting and the coffee or beverage prepared on the device immediately after the grinding operation so that the coffee or beverage thus prepared has the full natural aroma and flavor resulting from the retention of all of the oils and volatile elements of the freshly roasted and ground coffee.

Another object of the invention is to provide a device for preparing coffee that includes a roaster for roasting the coffee beans, a support for the water containing vessel for preparing the beverage, and a single heating element for roasting the coffee beans and for heating the water and brewing the beverage in the vessel.

Another object of the invention is to provide a device of the character mentioned that is entirely self contained and that is electrically actuated whereby it may be plugged in or connected with any suitable source of electricity.

Another object of the invention is to provide a device for preparing coffee in which the green coffee beans are placed in a roaster where they are subjected to roasting temperatures and are continuously agitated, and upon being properly roasted the beans are directly delivered to the grinder where the coffee is ground to the desired fineness for use in the coffee making vessel which is being heated by the heating element of the device.

Another object of the invention is to provide a device of the character mentioned in which the coffee beans are automatically exposed to view after being roasted for a predetermined period of time so that they may be examined and either discharged into the grinder or roasted for an additional period of time.

Another object of the invention is to provide a device of the character mentioned that is small and compact and readily portable whereby it may be installed and used in various locations at will.

A further object of the invention is to provide a device of the character mentioned that is convenient to use and that is sightly in appearance so that it is suitable for use in dwellings, hotels, restaurants, etc.

The various objects and features of the present invention will be fully understood from the following detailed description of a typical preferred form and application of the invention, throughout which description reference is made to the accompanying drawings, in which:

Fig. 1 is a front elevation of a device embodying the present invention. Fig. 2 is an enlarged vertical detailed sectional view taken as indicated by line 2—2 on Fig. 1. Fig. 3 is an enlarged fragmentary vertical detailed sectional view taken taken as indicated by line 3—3 on Fig. 2. Fig. 4 is an enlarged horizontal detailed sectional view taken as indicated by line 4—4 on Fig. 1. Fig. 5 is a fragmentary vertical detailed sectional view taken substantially as indicated by line 5—5 on Fig. 2 and Fig. 6 is a diagram of the electrical circuits embodied in the device.

The device of the present invention includes, generally, a body or case 10, heating means 11, a roaster 12 in the case 10 for carrying coffee beans to be roasted by the means 11, a grinder 13 in the case 10, and other parts and devices, the details and functions of which will be hereinafter described.

In accordance with the broader aspects of the invention the body or case 10 may be varied considerably in construction and design. In the particular form of the invention illustrated in the drawings the case 10 encloses the various parts and mechanisms and is such that the device may be moved or transported from place to place. The case 10 includes a bottom or base 14 and a cylindrical shell 15 projecting upwardly from the base. Ears 16 project from the base 14 at diametrically opposite points and carry upwardly projecting posts 17. Suitable handles 18 are provided on the two posts 17.

The heating means 11 is provided to heat water in a coffee making vessel V and brew the coffee therein and to roast the coffee beans in the roaster 12. In accordance with the invention the means 11 includes an electrical resistance element 19. The element 19 may be in the form of a helically wound wire having a relatively high resistance. The means 11 further includes a grill or plate 20 arranged on the upper end of the shell 15. The plate 20 preferably has a flat upper side and a downwardly projecting peripheral flange 20a extending into the shell 15. Lugs 21 project from the plate 20 and have openings passing the upper portions of the posts 17. Ornamental nuts 22 are threaded on the posts 17 to clamp or retain the plate 20 in position. A suitable frame 23 is provided to support the resistance element 19 a suitable distance below the plate 20. The plate 20 may be imperforate to be capable of use as a griddle or grill, or may be provided with a central opening as illustrated in the drawings. A perforated baffle or grill 24 is provided in the flange 20a and is spaced below the resistance element 19. Electrical leads or conductors 25 may extend through one of the posts 17 to the resistance element 19 and a switch 26 may be provided to control the heating means 11. The vessel V for brewing or making the coffee is adapted to rest on the plate 20 so that its contents may be heated or boiled. It is to be understood that any suitable form of coffee making vessel or device may be employed and that the invention is not to be construed as limited to the particular showing in the drawings.

The roaster 12 is provided to carry or contain the coffee beans to be roasted by the heat from the resistance element 19. The roaster 12 is normally disposed in the case 10 immediately below the heating means 11. In the particular form of the invention disclosed in the drawings the roaster 12 includes a disc like bottom 26 having an upwardly projecting annular flange 27 at its periphery. The roaster 12 is made deep enough to contain a suitable amount of coffee beans. The upper front or forward portion of the shell 15 is cut away to receive the roaster 12. An outwardly projecting ear 28 is provided on the flange 27 and has an opening 29 pivotally passing one of the posts 17. A yoked or notched ear 30 is provided on the outer or free side of the flange 27 to cooperate with or receive the other post 17. A pivotable or rotatable latch 31 is provided on the said other post 17 and is adapted to be moved to a position where it engages the front portion of the ear 30 to hold the roaster 12 in position in the case 10. The latch 31 may be swung or turned to a position where the roaster 12 may freely swing forwardly from the case 10. A spring 32 may be provided to automatically swing the roaster to its open or out position upon the release of the latch 31.

When the roaster 12 is in its normal operative position its flange 27 is substantially flush and concentric with the shell 15. A radial opening 33 is provided in the bottom 26 of the roaster 12. A sliding closure 34 normally closes the opening 33 in the bottom of the roaster. A handle 35 is provided on the outer end of the closure 34 and is accessible from the front of the device. A color chart C may be provided on the front side or portion of the flange 20a. The chart C may carry various numbered or identified shades of brown with which the roasted coffee beans may be compared. The invention includes means for agitating the coffee beans as they are roasted in the roaster 12. A shaft 36 extends upwardly through a central opening in the bottom 26 of the roaster. An agitator 37 is attached to the shaft 36 and has spaced radial arms movable over the bottom 26 with suitable clearance. The means for driving or rotating the agitator 37 will be hereinafter described.

The grinder 13 is provided to grind the coffee beans after they have been roasted in the roaster 12. It is a feature of the present invention that the grinder 13 receives the coffee beans directly from the roaster 12 immediately following the roasting operation. In the simple embodiment of the invention illustrated in the drawings the grinder 13 includes a hopper 38 mounted in the case 10 below the roaster bottom 26. The hopper 38 has an open upper end in direct alignment and register with the opening 33 in the bottom 26 of the roaster. A rotatable crusher and conveyor 39 extends through the lower portion of the hopper 38. The conveyor 39 has a spiralled ridge or thread 40 which feeds the coffee beans forwardly as the conveyor is rotated. If desired or found practical the thread 40 may be notched. The screw conveyor 39 extends through an opening 41 in the front of the hopper 38. A shaft 42 extends through an opening in the rear side of the hopper 38 and has a polygonal portion 43 slidably fitting a correspondingly shaped longitudinal opening 44 in the conveyor 39.

A stationary plate 45 is provided on the outer side of the forward end of the hopper 38 and has a central opening registering with the opening 41. A similar plate 46 is fixed or formed on the projecting end portion of the conveyor 39. The opposing faces of the plates 45 and 46 may be dished or concave to converge toward their peripheries. Concentric and radial or spiralled grooves 47 are provided in the opposing grinding faces of the plates 45 and 46. A cuplike member 48 is provided on the forward side of the hopper 38 and encloses the grinding plates 45 and 46. The member 48 has an opening 49a in its lower end for discharging the ground coffee. Means may be provided for adjusting the relative setting of the grinding plates 45 and 46 to grind the coffee to different degrees of coarseness. This adjusting means may comprise a screw 49 extending through an opening in the front of the shell 15 and threaded through an opening in the member 48 to bear or react against the grinding plate 46. The outer end of the screw 49 may be provided with a suitable winged handle 50. A lock nut 51 may be provided on the screw 49 for fitting or locking the screw in its adjusted position. As the conveyor 39 is longitudinally shiftable on the shaft portion 43 the screw 49 may be employed to move or adjust the conveyor and plate 46 relative to the plate 45 to vary the action of the grinder. A removable receiver 52 is arranged in the case 10 below the grinder 13 and is provided in its upper end with an opening 53 adapted to register with the discharge opening 49 of the grinder. The receiver 52 for the ground coffee is removable through an opening 54 in the front of the shell 15 and is provided with a suitable handle 55.

Power means is provided to operate the agitator 37 and the grinder 13. The power means may comprise an electric motor 60 mounted on the base 14 at the rear of the grinder 13. Suitable drives or trains of gears may be interposed between the motor 60 and the grinder shaft 42 and the agitator shaft 46 for the purpose of operating the grinder and agitator at the required rates of speed. In the particular arrangement illustrated in the drawings a pinion 61 is provided on the shaft of the motor 60 and meshes with an idler gear 62. The idler gear 62 carries a pinion 63 which meshes with a gear 64 on the grinder shaft 42. A rearwardly projecting worm 65 is provided on the gear 64 and cooperates with a worm wheel 66 carried by a vertical shaft 67. A pinion 68 is fixed on the upper end of the shaft 67 and meshes with a gear 69 on the projecting lower portion of the agitator shaft 36. The pinion 68 is located behind the gear 69 so that the gear 69 is readily disengageable from the pinion when the roaster 12 is swung forwardly from the case 10. The gear 69 is adapted to move outwardly through notches 9 in the hopper during the pivoting of the roaster. It will be apparent how the electric motor 60 is operatable to simultaneously drive both the grinder 13 and the agitator 37. A switch 70 may be provided in the motor circuit 71 to control the motor 60.

The device may include means for automatically controlling the roaster 12 whereby the coffee beans are roasted for a predetermined period of time and are then automatically exposed for inspection. The automatic control for the roaster 12 may include a solenoid coil 73 whose armature has a pin 74 adapted to cooperate with an opening 75 in the roaster bottom 26 to hold roaster in its closed or in position when the coil is energized. An adjustable time delay switch 77 governs the solenoid coil 73. The switch 77 may be set or adjusted and then manually closed to remain closed for a predetermined or selected period whereupon it opens to de-energize the coil 73. When the coil 73 is de-energized the spring 32 swings the roaster to its out position where the coffee beans therein are exposed for inspection. The latch 31 is opened immediately following the closing of the time delay switch so that the roaster is under the control of the coil 73.

It is believed that the operation of the device of the present invention will be readily apparent from the foregoing detailed description. A suitable quantity of water may be placed in the vessel V and a suitable or proportionate quantity of green coffee beans may be placed in the roaster 12. The roaster 12 may be latched in its closed position and the time delay switch 77 may be set to de-energize the solenoid coil 73 after a suitable period. The device may be plugged into any suitable electrical circuit to cause the energization of the heating element 19 and the motor 60 and the latch 31 is then released so the roaster is under the control of the coil 73 and time delay switch 77. The heat from the resistance element 19 heats or boils the water in the vessel V and at the same time roasts the coffee beans in the roaster 12. The coffee beans in the roaster are continuously agitated by the power driven agitator 37. Upon the elapse of the predetermined period the time delay switch 77 opens to de-energize the coil 73 and allows the roaster 12 to swing to its open position at the front of the device. The coffee beans in the roaster may then be examined and compared with the colors on the chart C. The period which coffee beans should be roasted depends on the character of the beans, the atmospheric conditions, and other variable factors and it may be necessary to roast the beans for an additional period after the opening of the switch 77. If it is believed that the coffee beans require further roasting after being inspected the roaster 12 may be returned to its normal "in" position, and latched by the latch 31 and the coffee beans roasted for an additional period. When the beans have been sufficiently roasted the closure 35 may be pulled forwardly or opened to discharge the roasted coffee beans into the hopper 38. The agitator 37 feeds or delivers the coffee beans to the opening 33 so that the roaster is completely emptied in a short time.

The freshly roasted coffee beans delivered to the hopper 38 are partially crushed by the conveyor 39 and are fed forwardly between the grinding plates 45 and 46. The conveyor 39 and the plate 46 are continuously rotated by the motor 60 through the gearing above described so that the grinder may be available for use at any time. The coffee beans are effectively ground between the plates 45 and 46 and the ground coffee discharges through the opening 49 into the receiver 52. When the coffee has been ground the receiver 52 may be withdrawn and the ground coffee placed in the vessel V. The water for making the beverage or coffee may have been heated or boiled during the roasting and grinding of the coffee and the heating means 11 may be employed to brew or prepare the beverage. It will be apparent that a continuous succession of roasting, grinding, and coffee preparing steps may be readily carried out with the device of the present invention.

Having described only a typical preferred form and application of my invention, I do not wish to be limited or restricted to the specific form and application herein set forth, but wish to reserve to myself any modifications or variations that may appear to those skilled in the art or fall within the scope of the following claims.

Having described my invention, I claim:

1. In a device of the character described a case, a heating element in the case, a tray for containing coffee beans carried by the case for movement between a position adjacent the heating element where the beans may be roasted and a position removed from the heating element where the beans may be examined, an agitator in the tray, power means in the case for operating the agitator when the tray is in the first named position, means normally tending to move the tray to the last named position, and means for holding the tray stationary in the first named position automatically releasable at the end of a selected period of time to allow the tray to move to the last named position.

2. A device of the character described comprising, an open topped roaster tray supported for horizontal swinging movement, a heating element operable to heat the roaster tray, means tending to swing the roaster tray away from the heating element, electromagnetic means for holding the roaster tray at the heating element, and regulable time delay means for releasing the electromagnetic means.

WILLIAM F. SWAGER.